United States Patent [19]

Gomez

[11] 4,275,175
[45] * Jun. 23, 1981

[54] MOLDING COMPOSITIONS AND PROCESS FOR PREPARING SAME

[75] Inventor: I. Luis Gomez, Longmeadow, Mass.

[73] Assignee: Monsanto Company, St. Louis, Mo.

[*] Notice: The portion of the term of this patent subsequent to Jul. 29, 1997, has been disclaimed.

[21] Appl. No.: 41,121

[22] Filed: May 21, 1979

Related U.S. Application Data

[62] Division of Ser. No. 957,882, Nov. 6, 1978, Pat. No. 4,215,085.

[51] Int. Cl.$^3$ ............................ C08K 5/10; C08K 5/16
[52] U.S. Cl. ....................................... 525/5; 260/4 R; 260/4 AR; 260/30.2; 260/31.2 N; 260/32.4; 525/6

[58] Field of Search ............ 525/5, 6; 260/4 R, 4 AR, 260/30.2, 31.2 N, 32.4

[56] References Cited

U.S. PATENT DOCUMENTS 4,108,818  8/1978  Odawara et al. .................... 264/211

Primary Examiner—Harry Wong, Jr.
Attorney, Agent, or Firm—Michael J. Murphy

[57] ABSTRACT

Improved molding compositions and a dry blend process for preparing same, such compositions being especially adapted for shaping into packaging materials and comprising a blend of a nitrile polymer and a member selected from the group consisting of unsaturated fatty acid aldehydes, and esters formed by the reaction of a short chain olefinic alcohol with a fatty acid or cyanuric acid.

9 Claims, No Drawings

MOLDING COMPOSITIONS AND PROCESS FOR PREPARING SAME

This is a division of application Ser. No. 957,882, filed Nov. 6, 1978 now U.S. Pat. No. 4,215,085.

CROSS REFERENCE TO RELATED APPLICATIONS

1. Molding Compositions And Process For Preparing Same, E. F. Tokas, U.S. Ser. No. 951,493, filed Oct. 16, 1978, now U.S. Pat. No. 4,180,486.

2. Molding Compositions And Process For Preparing Same, I. L. Gomez and E. F. Tokas, U.S. Ser. No. 957,301, filed Nov. 2, 1978, now U.S. Pat. No. 4,215,024.

BACKGROUND OF THE INVENTION

This invention relates to molding compositions and more particularly to improved molding compositions and a process for preparing same wherein such compositions are especially adapted for shaping into products such as packaging materials wherein free AN monomer therein is low.

Thermoplastic nitrile polymer compositons containing polymerized AN can be shaped into a wide variety of useful articles by conventional techniques such as extrusion, calendering, milling, molding, drawing, blowing, etc. Applications for such shaped articles are widespread and include structural units where properties such as stiffness, impact resistance, dimensional stability, high gloss and toughness are required, for example pipe, bars, appliance housings, wheeled vehicle parts, refrigerator liners and the like, replacements for glass for weight reduction as for automotive lenses, layer(s) in laminated windshields, security panels and/or other multi-layer structural laminates. When the polymerized AN level is at least about 50 weight percent, the compositions uniquely exhibit excellent solvent resistance and low permeability to liquids and gases which make them especially useful as a lightweight substitute for glass in packaging and particularly in the manufacture of bottles, film, sheet, tubs, cups, trays and other containers for liquids and solids.

In manufacturing nitrile polymer compositions, it is well known and has been tolerated that trace levels of free, unconverted, AN monomer remain absorbed within the polymer particles when polymerization is not 100% complete and which is therefore present in products formed therefrom. Recently, however, certain government regulatory agencies are moving toward establishing maximum permissible levels of AN monomer in the environment on grounds that excess AN levels in the atmosphere generated during handling and working of these resins may constitute a health hazard in view of the toxicity of AN monomer. REgulations in particular have been applied to packaging materials intended for contact with environmentally sensitive products such as food, beverages, pharmaceuticals, cosmetics and the like for which application nitrile polymers are especially suited.

Efforts to reduce free, unreacted AN in nitrile polymers in response to such government pronouncements have involved steam stripping the polymer before melt processing, and when carried out for a sufficient time this can greatly reduce the residual monomer to miniscule levels. However, even with polymer initially having extremely low residual AN content, it was unexpectedly discovered that free AN monomer is thermally regenerated due to polymer unzipping up to levels on the order of 13 to 18 times the initial level during melting at standard melt processing times and temperatures. Such an increase caused an associated increase in extractable AN from shaped packaging materials in contact with food simulating solvents. Accordingly, reduction of AN monomer in the raw polymer proved unsuccessful in minimizing AN in shaped products formed in an operation involving melt processing.

SUMMARY OF THE INVENTION

Now, however, improvements have been developed to minimize such prior art shortcomings.

Accordingly, a principal object of this invention is to provide polymeric molding compositions containing polymerized acrylonitrile which minimize generation of free AN monomer during conversion to melt form.

Another object is to selectively provide in a polymerized-acrylonitrile-containing molding composition, a chemical scavenger for or regulator of AN monomer which is effective at miniscule levels of AN monomer to minimize generation of the latter during melt processing of such compositions.

A further object is to provide such a molding composition and a process for preparing same which contains a scavenger at low concentrations which is compatible with the polymer to avoid the need of excess amounts which could cause deterioration of properties in the shaped product, such as optical (e.g. color and haze) and taste properties which are important in packaging environmentally sensitive materials.

Other objects of this invention will in part be obvious and will in part appear from the following description and claims.

These and other objects are accomplished by providing a molding composition comprising a blend of a nitrile polymer containing at least about 10 weight percent based on total polymer weight of polymerized acrylonitrile and about 0.005 to about 2% by weight based on the weight of the polymer of a compound selected from the group consisting of unsaturated fatty acid aldehydes, and esters formed by the reaction of a short chain olefinic alcohol with a fatty acid or cyanuric acid.

From a process standpoint, there is provided a process for preparing an extruded pelleted molding composition which comprises dry blending a nitrile copolymer containing free acrylonitrile monomer with about 0.005 to about 2% by weight based on the weight of the polymer of a compound selected from the group consisting of unsaturated fatty acid aldehydes, and esters formed by the reaction of a short chain olefinic alcohol with a fatty acid or cyanuric acid, wherein the nitrile copolymer comprises at least about 10% by weight of polymerized acrylonitrile, melting and extruding the resulting blend, and then pelletizing the extrudate.

PREFERRED EMBODIMENTS

Nitrile polymers useful in the present invention generate free AN monomer during melting and contain at least about 10% by weight of polymerized AN with one or more copolymerized comonomers. Such comonomers include:

(a) the monovinylidene aromatic hydrocarbon monomers of the formula:

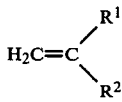

wherein $R^1$ is hydrogen, chloride or methyl and $R^2$ is an aryl group of 6 to 10 carbon atoms and may also contain substituents such as halogen as well as alkyl groups attached to the aromatic nucleus, e.g., styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

(b) lower alpha olefins of from 2 to 8 carbon atoms, e.g., ethylene, propylene, isobutylene, butene-1, pentene-1 and their halogen and aliphatic substituted derivatives, e.g., vinyl chloride, vinylidene chloride, etc.

(c) acrylic acid and methacrylic acid and the corresponding acrylate and methacrylate alkyl esters where the alkyl group contains from 1 to 4 carbon atoms, e.g., methyl acrylate, ethyl acrylate, propyl acrylate, methyl methacrylate, etc.

(d) vinyl esters of the formula:

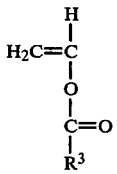

wherein $R^3$ is hydrogen, an alkyl group of from 1 to 10 carbon atoms, an aryl group of 6 to 10 carbon atoms, e.g., vinyl formate, vinyl acetate, vinyl propionate, vinyl benzoate, etc., (e) vinyl ether monomers of the formula:

wherein $R^4$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbons or oxygen—containing, i.e., an aliphatic radical with ether linkages and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, etc.

(f) olefinically unsaturated mononitriles having the formula:

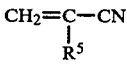

wherein $R^5$ is an alkyl group having 1 to 4 carbon atoms or a halogen. Such compounds include methacrylonitrile; ethacrylonitrile; propioacrylonitrile, alpha chloracrylonitrile, etc.

Additional comonomers useful in the practice of this invention are those comonomers which contain a mono- or dinitrile function. Examples of these include methylene glutaronitrile, 2, 4-dicyanobutene-1, vinylidene cyanide, crotonitrile, fumaronitrile, maleonitrile.

Preferred comonomers are the monovinylidene aromatic hydrocargons, lower alpha olefins, acrylic and methacrylic acid and the corresponding acrylate and methacrylate esters, with the monovinylidene aromatic hydrocarbons being more particularly preferred. Most specifically preferred is styrene and alpha methylstyrene. Another preferred composition is a terpolymer of acrylonitrile, styrene and vinyl ether such as disclosed in U.S. Pat. No. 3,863,014.

The amount of comonomer as defined above present in the nitrile composition can vary up to about 90% by weight based on the total weight of the nitrile polymer composition. Preferred nitrile compositions for packaging applications requiring excellent oxygen and water vapor barrier properties in the packaging materials contain at least about 50%, e.g., from about 50 to 90% by weight of polymerized acrylonitrile monomer and from about 10 to about 50% by weight of comonomer and more preferably from about 55 to about 85% by weight of acrylonitrile monomer and from about 15 to about 45% by weight of comonomer, all based on total polymer weight.

Nitrile polymers within the scope of this invention may also contain an elastomer in the form of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc., which are used to strengthen or toughen products such as shaped packaging materials. This rubber component may be incorporated into the nitrile polymer by any of the methods well known to those skilled in the art, e.g., direct polymerization of monomers, polyblends, grafting the acrylonitrile monomer mixture onto the rubbery backbone, etc. Especially preferred are polyblends derived by mixing a graft copolymer of acrylonitrile and comonomer on the rubbery backbone with another copolymer of acrylonitrile and the same comonomer. Generally, such rubber component may comprise from 0 to about 25% and preferably up to about 10% by weight of the nitrile polymer composition.

The active treating ingredient for reducing the free AN monomer content of the nitrile polymer is a scavenging compound in the form of a member selected from the group consisting of (i) unsaturated fatty acid aldehydes, i.e., aldehydes which can be (though not necessarily have to be) derived from unsaturated fatty acids, (ii) esters formed by the reaction of a short chain (contining two to four carbon atoms) olefinic alcohol with a fatty acid or cyanuric acid and (iii) mixtures of (i) and (ii). The term "fatty acid" as used herein refers to a saturated or unsaturated aliphatic acid having from 6 to 20 carbon atoms. Unsaturated fatty acid aldehydes useful in the practice of the invention include aldehydes of unsaturated fatty acids such as hypogeic acid ($C_{15}H_{29}COOH$), ricinoleic acid ($C_{18}H_{34}O_3$), teracrylic acid ($C_6H_{11}COOH$) and the like including polyunsaturated aldehydes such as retinaldehyde ($C_{20}H_{28}O$) and citral ($C_9H_5CHO$).

Citral, which is the preferred aldehyde, is a light, oily liquid which can occur in natural form, having a relatively high boiling point of 92°–95° C. at 2.6 mm. Hg. A high boiling point is an advantage since it minimizes losses due to vaporization which can occur during melt processing of the polymer at elevated temperature. In place of pure natural citral or synthetic citral it is possible to use materials rich in citral.

Useful esters of $C_2$-$C_4$ unsaturated alcohols with fatty acids comprise caprylic, lauric, myristic, arachidic, stearic, palmitic, oleic, etc., acid esters having the formula

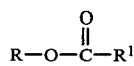

where R is a vinyl, allyl, crotonyl or 3-butenyl group and $R^1$ is the fatty acid radical. Vinyl stearate is preferred. Useful cyanuric acid esters include mono and polyesters having the formula:

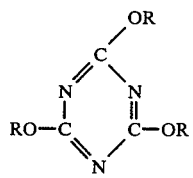

where R is hydrogen or a vinyl, allyl, crotonyl or 3-butenyl group provided that at least one R is an esterifying group. Tri allyl cyanurate is preferred.

The amount of scavenging compound used in the present invention is calculated to reduce the free residual acrylonitrile monomer (RAN) in the nitrile polymer after melting to a level less than that which would be present in the absence of such compound during melting. Such reduced levels of RAN in the polymer in turn are predicted to result in reduced extractable AN monomer levels from shaped packaging materials formed of the polymer in contact with food, pharmaceuticals, margarine, butter or like substances. Such amount of scavenging compound should be insufficient to impart any scavenging-compound-originated taste to any such packaged substances. Allowance should also be made for vaporization of some of the admixed scavenging compound during melting of the nitrile polymer. In general the regulating amount of scavenging compound required to achieve this reduction in residual and extractable AN content will be in the range of from about 0.005 to about 2.0% by weight based on the weight of the nitrile polymer. In most applications the amount of such compound will be in the range of from about 0.01 to about 1.5% by weight. When using a compound which yields one or more of the previously recited specific scavenging compounds or else behaves as such a scavenging compound donor, the amount is calculated so as to provide an amount of scavenging compound within the preceding ranges.

As stated, the improved molding compositions of this invention comprise an intimate blend of nitrile polymer and a compound selected from the group consisting of unsaturated fatty acid aldehydes, and esters formed by the reaction of a short chain olefinic alcohol with a fatty acid or cyanuric acid. The intimate mixture of scavenging compound and nitrile polymer may be obtained by combining the scavenging compound with the nitrile polymer during or after polymerization, as for example, by adding it to the nitrile polymer in the polymer recovery steps such as during coagulation, stripping, washing, drying, etc., or by steeping the polymer in the presence of the scavenging compound. Another method is to dry blend the nitrile polymer and scavenging compound prior to the melting step used in shaping the polymer. In still another method the scavenging compound and nitrile polymer are dispersed in a liquid medium followed by evaporation of the liquid medium. In still another method, the scavenging compound is injected into the molten polymer during the melting operation. Other methods of forming the intimate mixture will become apparent to those skilled in the art upon reading the present specification.

In general, the preferred method of admixing the nitrile polymer and scavenging compound is blending the nitrile polymer in dry form with the scavenging compound.

The forming operations used to prepare products from the molding compositions of this invention such as the preferred polymeric packaging materials, e.g., film, sheet, tubs, trays, containers such as bottles, cans, jars, etc., preforms for forming same and the like, are carried out by shaping the molding compositions by procedured known in the art. In this connection, conventional plasticators can be used utilizing a screw rotating within a plasticizing zone to masticate the polymer wherein the screw is either axially fixed or reciprocable, the latter occurring for example in an injection molding system. The forming operations include both a melting step wherein the nitrile polymer is converted from solid to melt form by physical working at temperatures in the range of from about 93° to about 274° C. and any subsequent shaping step performed on the melt. The melting and shaping steps may occur sequentially or substantially simultaneously. Examples of forming operations used to prepare polymeric packaging materials include pelletizing, extrusion, blow molding, injection molding, compression molding, mill rolling, calendering, vacuum forming, plug assist thermoforming from sheet material, combinations of the foregoing and the like.

More than one forming operation wherein the nitrile polymer composition is heated and shaped may be involved in certain instances. This occurs, for example, in the case of a polymer which is heated through working to a melted state, extruded and pelletized and then the pellets are heated again for melting and shaped into a finished end product such as a sheet or into an intermediate shaped tubular parison which is then reshaped into a container such as a shallow tub or bottle. In such situations, the present invention contemplates having the scavenging compound in intimate contact with the nitrile resin during at least one of the forming operations wherein the polymer is heated to the point where it melts and is then shaped. Preferably when more than one heating step is involved, the scavenging compound is intimately admixed with the nitrile polymer before or during the first step wherein the polymer is heated to the point where it melts.

The actual measurement of the amount of RAN in products formed of nitrile polymers is not considered part of this invention. In this regard any method capable of detecting AN monomer to about 1 ppm can be used to measure the amount of AN monomer in products of nitrile polymers. Such methods, which are known to those in the art, include colorometric, polarographic, gas chromatographic, fluorometric and electrochemical measurements. Methods for measuring RAN in nitrile polymers to 1 ppm and extractable AN monomer to 10 parts per billion (ppb) in the extract are available to the public upon request from the U.S. Food and Drug Administration and are described in and a part of Food and Drug Administration Regulation No. 121.2629 which is referenced in The Federal Register, Vol. 40, No. 30.

The present invention also contemplates the use of other additives and ingredients in the polymeric compositions which do not adversely affect the properties of the resulting moled products such as taste when such products are packaging materials intended for food contact use. Examples of these ingredients include thermal stabilizers, light stabilizers, dyes, pigments, plasticizers, fillers, antioxidants, lubricants, extrusion aids, etc.

The following examples are set forth in illustration of the invention and should not be construed as limitations thereof. All parts and percentages of resin and scavenging compound are by weight unless otherwise specified. Wherever convenient, residual acrylonitrile is abbreviated as RAN. The amount of scavenging compound is based on the weight of the nitrile polymer. A dash in a Table means that particular product was not tested.

EXAMPLES 1 TO 3

A copolymer in bead form containing 68% polymerized AN and 32% polymerized styrene prepared by conventional aqueous polymerization methods was dry blended with various scavenging amounts of an ester formed by the reaction of a short chain olefinic alcohol with a fatty acid, which ester is in the specific form of vinyl stearate. Blending to insure intimate admixture of the polymer and this additive was carried out by placing the quantities of each in a polyethylene bag and shaking vigorously for 2 minutes. The nitrile polymer blends were converted from solid to melt form by physically working the polymer in multiple pass extrusion with a conventional plasticator in the form of a one inch extruder having a 16:1 L/D ratio fitted with a rotary two stage screw operating at 70 r.p.m. Extrudate strands issuing from the die were cut into pellet form. Zone temperatures of the extruder were set to provide a melt stock temperature of approximately 260° C. After each pass samples were analyzed for RAN content with the results of these tests tabulated in Table I below.

TABLE I

| | SUMMARY OF EXAMPLES 1 TO 3 | | | | |
|---|---|---|---|---|---|
| | | | ppm RAN | | |
| Ex. | Percent Vinyl Stearate | Polymer Beads | 1 Pass | 2 Passes | 3 Passes |
| 1 | 0.0 | 0.7 | 9.4 | 11.6 | 12.7 |
| 2 | 0.8 | 0.7 | 7.5 | — | 8.3 |
| 3 | 0.5 | 0.7 | 8.7 | — | 5.5 |

Control Example 1 illustrates that without vinyl stearate the level of RAN in the polymer during melt processing increases about thirteen to eighteen fold depending on the number of extrusion passes, vis-a-vis the initial RAN level in the polymer. Examples 2 and 3 illustrate that the use of small scavenging amounts of vinyl stearate effectively suppresses and regulated the amount at very dilute concentrations of the additive and the RAN in the polymer, and in the case of Example 3 maintains such RAN level at no greater than about 7 ppm.

EXAMPLES 4 TO 7

Nitrile polymer of the type used in Examples 1 to 3 is dry blended for five minutes in a high speed laboratory mixer (Welex) with various scavenging amounts of vinyl stearate or an unsaturated fatty acid aldehyde in the form of citral. Such blends are then converted from solid to melt form by physically working the polymer in a 1.25 inch (3.2 cms.) diameter extruder having a rotary screw (20/1 L/D ratio) operating at 50 r.p.m. with a melt stock temperature of 277° C. Extrudate issuing from the die is cut into pellet form and samples analyzed for RAN content with the results of such tests tabulated in Table II below.

TABLE II

| | SUMMARY OF EXAMPLES 4 TO 7 | | | | |
|---|---|---|---|---|---|
| | | Percent | Polymer | ppm RAN | |
| Ex. | Regulator | Regulator | Beads | 1 Pass | 2 Passes |
| 4 | None | 0.0 | <1 | — | 8.6 |
| 5 | Vinyl Stearate | 0.02 | <1 | 3.5 | — |
| 6 | Vinyl Stearate | 0.05 | <1 | — | 8.3 |
| 7 | Citral | 0.1 | <1 | — | 3.5 |

Examples 5 and 6 in comparison to Example 1 illustrate that the presence of even smaller amounts of vinyl stearate scavenger than those of Examples 2 and 3 suppresses the amount of RAN in the polymer at very dilute concentrations of RAN in the polymer. Example 7 illustrates the effectiveness of citral as such an RAN regulator.

EXAMPLES 8 TO 13

The following Examples 8 to 13 illustrate the invention in providing shaped products with low RAN content which are intended for packaging environmentally sensitive subtances. Nitrile polymer of the type used in Examples 4 to 7 is dry blended with various amounts of scavenging compound in the Welex mixer and then melt compounded in a single pass extrusion step and formed into pellets using the same mixing extruder and operating conditions as described in Examples 4 to 7. The pellets were then injection molded in a commercial size injection molding machine at temperatures in the range of from 230° to 270° C. into hollow, tubular preforms of circular cross section, closed at one end and having a molded finish at the other end. Such preforms are further described in U.S. Pat. No. 3,900,120, col. 5, lines 13-42, the content of which is incorporated herein by reference. After cooling to room temperature, preforms formed as just described are reheated to molecular orientation blowing temperature of about 132° to 138° C. and then distended in a conventional blow mold into 32 ounce (950 cc.) self-supporting bottles intended for packaging beverages and the like. The level of RAN in the bottles is then determined. The polymer forming such preforms and bottles is considered to contain the reaction product of (a) an RAN chemical scavenger comprising a member selected from the group consisting of unsaturated fatty acid aldehydes and esters formed by the reaction of a short chain olefinic alcohol with a fatty acid or cyanuric acid, i.e., vinyl stearate, citral or tri allyl cyanurate and (b) AN monomer. Separate controls are run as indicated below. The results of these tests are tabulated in Table III below.

TABLE III

| | SUMMARY OF EXAMPLES 8 TO 13 | | | |
|---|---|---|---|---|
| | | | RAN (ppm) | |
| Ex. | Percent Regulator | Regulator | Starting Polymer Beads | Bottle |
| 8 | 0.0 | None | <1 | 7.7 |
| 9 | 0.1 | Citral | <1 | 4.7 |
| 10 | 0.0 | None | <1 | 7.9 |
| 11 | 0.05 | Tri Allyl Cyanurate | <1 | 4.8 |

TABLE III-continued

SUMMARY OF EXAMPLES 8 TO 13

| Ex. | Percent Regulator | Regulator | RAN (ppm) Starting Polymer Beads | Bottle |
|---|---|---|---|---|
| 12 | 0.0 | None | <1 | 12.4 |
| 13 | 0.05 | Tri Allyl Cyanurate* | <1 | 7.0 |

*Includes 1.25% of a rubber crumb material of composition:
butadiene - 30–34%
styrene - 38–42%
acrylonitrile - 16–20%
methyl methacrylate - 8–10%
ethylene glycol dimethyl acrylate - 0.5–1.0%

The above data illustrates the efficiency of citral and tri allyl cyanurate in reducing the amount of RAN in the walls of containers formed of nitrile resins according to the invention to levels below those in the controls containing no RAN scavenger, and in some cases to less than 7 ppm in such bottles. Though not specifically analyzed for RAN, the additional minimal heat history experienced by the preforms in reheating to bottle blowing temperatures is considered not to significantly affect RAN level in the preforms vis-a-vis that present in the formed bottles.

To the best of applicant's knowledge, substitution of other forms of shaped packaging materials for the bottles of Examples 8 to 13 such as film or sheet material useful as overwrappings, tubs or cup-like containers useful in holding margarine, butter and similar-based food products as well as trays for holding meats, should give similar results to those of the preceding examples in terms of low level of RAN at comparable levels of RAN in the shaped packaging materials and of polymerized AN in the copolymer nitrile resin. Similarly reduced will be the level of RAN extracted out of the packaging material into the environmentally sensitive contents or simulant thereof.

Similarly, substitution of nitril polymers containing levels of polymerized AN down to about 10% and preferably to about 20%, the latter being known as styrene/acrylonitril (SAN) resins, as well as copolymers of styrene and acrylonitrile containing an elastomer which are known as ABS resins, for those of the foregoing Examples should give comparable low level regulation of RAN in the melted resin and shaped products at comparable starting levels of free AN in the initial raw material polymer.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. A molding composition comprising a blend of a nitrile polymer containing at least about 10 weight percent based on total polymer weight of polymerized acrylonitrile and about 0.005 to about 2% by weight based on the weight of the polymer of a compound selected from the group consisting of unsaturated fatty acid aldehydes, and esters formed by the reaction of a short chain olefinic alcohol with a fatty acid or cyanuric acid.

2. A molding composition as in claim 1 wherein the nitrile polymer comprises at least about 50% by weight of polymerized acrylonitrile.

3. A molding composition as in claim 1 wherein the nitrile polymer comprises from about 50 to about 85 weight percent acrylonitrile.

4. A molding composition as in claim 3 wherein styrene is a copolymerized monomer.

5. A molding composition as in claim 4 wherein the nitrile polymer further contains from about 0 to about 25% by weight of a synthetic or natural rubber component.

6. A molding composition as in claims 1, 2, 3, 4 or 5 wherein said composition contains a member selected from the group consisting of citral, vinyl stearate and tri allyl cyanurate.

7. The composition of claim 6 wherein the member is citral.

8. The composition of claim 6 wherein the member is vinyl stearate.

9. The composition of claim 6 wherein the member is tri allyl cyanurate.

* * * * *